United States Patent [19]

Coll

[11] Patent Number: 5,209,439
[45] Date of Patent: May 11, 1993

[54] DROP WIRE CLAMP

[75] Inventor: Gene P. Coll, Cranford, N.J.

[73] Assignee: Diamond Communication Products, Inc., Garwood, N.J.

[21] Appl. No.: 849,234

[22] Filed: Mar. 11, 1992

[51] Int. Cl.$^5$ .............................................. F16L 3/08
[52] U.S. Cl. ...................................... 248/65; 24/129 B
[58] Field of Search ............. 248/65, 74.1; 24/129 R, 24/129 B, 122.6; 174/79

[56] References Cited

U.S. PATENT DOCUMENTS

| | | | |
|---|---|---|---|
| 1,135,736 | 4/1915 | Steuler | 24/129 B |
| 3,012,306 | 12/1961 | Tindell | 174/79 X |
| 3,932,697 | 1/1976 | Hood | 24/122.6 X |
| 4,438,293 | 3/1984 | Voser | 174/79 |
| 4,496,212 | 1/1985 | Harvey | 174/79 X |

FOREIGN PATENT DOCUMENTS

| | | | |
|---|---|---|---|
| 1286744 | 4/1964 | France | 174/79 |
| 900667 | 7/1962 | United Kingdom | 174/79 |

Primary Examiner—J. Franklin Foss
Attorney, Agent, or Firm—Wegner, Cantor, Mueller & Player

[57] ABSTRACT

A drop wire clamp useful for double-stranded figure eight cable is provided with a trough and an apertured plate descending from one end of the trough so that the clamp can be suspended from a suitable support. The trough is dimensioned to accept the cable without threading and without compression on the signal-carrying portion of the cable. The cable is retained in the trough by wrapping separated semi-rigid support strand around the trough.

11 Claims, 2 Drawing Sheets

DROP WIRE CLAMP

BACKGROUND OF THE INVENTION

The present invention is directed to a drop wire clamp for use with aerial cable. The clamp is particularly designed for use with double stranded cables, which include a signal-carrying strand and a support strand. An example of such cable is known as "FIG. 8" cable, which includes a coaxial CATV signal-carrying strand and a support strand which is held by various clamps to support the cable as desired.

Drop wire clamps are used to support drop wire, for example CATV drop wire which extends from the pole to the customer's premises, at the ends of the drop wire. The clamp is used to support the weight of the cable so that the cable connection at the end is not strained.

Previous drop wire clamps for a double-stranded cable have either required difficult threading operations (i.e., requiring the passage of the end of the double-stranded cable through an aperture, and/or relied upon wrapping which grips the cable, which exposes the cable to pressure and can result in squeezing of coaxial cable with resultant distortion of picture quality and loss of frequency transmission.)

SUMMARY OF THE INVENTION

The present invention provides a drop wire clamp which is easy to use and avoids the application of compressive forces to the cable. The clamp of the present invention includes an open trough for accepting the cable without threading. The cable is retained in the trough by separating a length of support strand from the cable and wrapping it around the trough. The clamp is adapted to engage suitable supports so that the clamp can be supported from a desired structure, such as the residence of the customer.

DETAILED DESCRIPTION OF THE INVENTION

Figure 1:
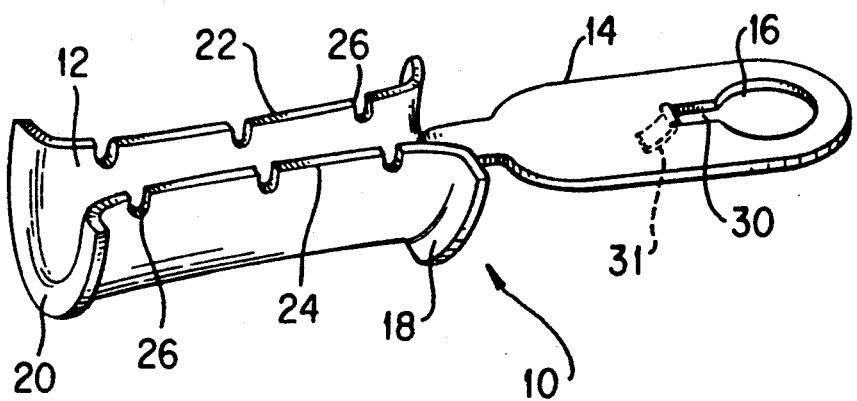
FIG. 1 shows a perspective view of a clamp according to the present invention.

Referring to FIG. 1, the clamp 10 of the present invention is formed generally by trough 12 and plate 14 which extends from one end of the trough. The trough is used for carrying the cable, while the plate is used to suspend the clamp from a support. Examples of such supports include "P" hooks and "Q" span clamps. Aperture 16 is provided to engage the support, e.g., the loop of the "P" hook or "Q" clamp.

Figure 2:
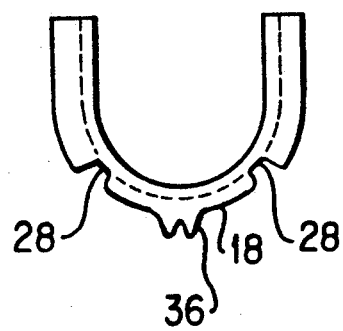
FIG. 2 shows a detailed view of one of the flanges defining an end of the trough in FIG. 1.

The ends of the trough 12 may be defined by flanges 18 and 20. The open portion of the trough is bounded by edges 22 and 24. These edges are provided with notches 26 which retain support strand which has been separated from the cable, in a manner discussed below. Although notches are preferred for ease of manufacture, protruberances or other methods of retaining the strand could be used instead. As seen in FIG. 2, the flanges also can be provided with retaining notches 28. It is preferred that at least flange 18 adjacent the plate be provided with the notches.

Plate 14 is provided with an aperture 30 which accepts the support strand from the cable prior to its being wrapped around the trough engaged by the notches 26 and 28. As shown in the Figures, aperture 30 may be connected to aperture 16 to form a keyhole slot, or it may be entirely separate. The support strand thus will bear against the edges of the aperture 30 at the portion nearest the trough. Therefore, to reduce the chance of damage to the support strand, it is preferred that the edges of the aperture 30 be radiused at least at the portion upon which the support strand will bear. Alternatively, this can be accomplished by forming the aperture by means of a folding tab 31, as shown in the figures, with the fixed side of the tab being closest to the trough and the free end of the tab being closest to the free end of plate 14 prior to folding. The folding of the tab will create an effect similar to the radiusing operation.

Figure 3:
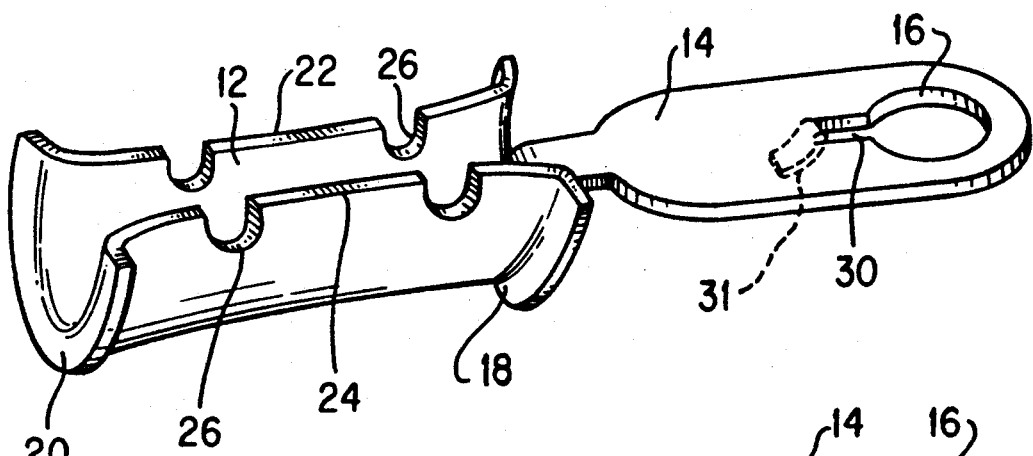
FIG. 3 shows a perspective view of a second embodiment of a clamp according to the present invention.
Figure 3A:
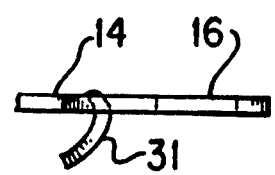
FIG. 3A shows a side view of the end of the clamp of FIG. 3.

The drop wire clamp of the present invention can be from any suitable material, but preferably is made from metal, especially steel. The clamp can be formed from a metal plate by suitable stamping and bending operations. The thickness of the plate is generally about 3/64". The clamp generally will have a length 6" or so. The trough may have a width of about ⅜" and a depth of about ½". These dimensions are generally suitable to hold a double-stranded CATV cable without compression of the message strand. Notches 26 and 28 are preferably part-circular, having a diameter of about 3/32". While three sets of notches 26 are shown in FIG. 1, as shown in FIG. 3, two sets of notches can be used. More can be used if desired. It can also be seen that the bottom of the trough can be flat (i.e., the depth is uniform) or curved (the depth varies).

Figure 4:
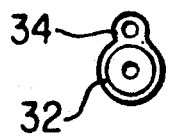
FIG. 4 shows a cross-sectional view of a double-stranded cable which would be used with the clamp of the present invention.
Figure 5:
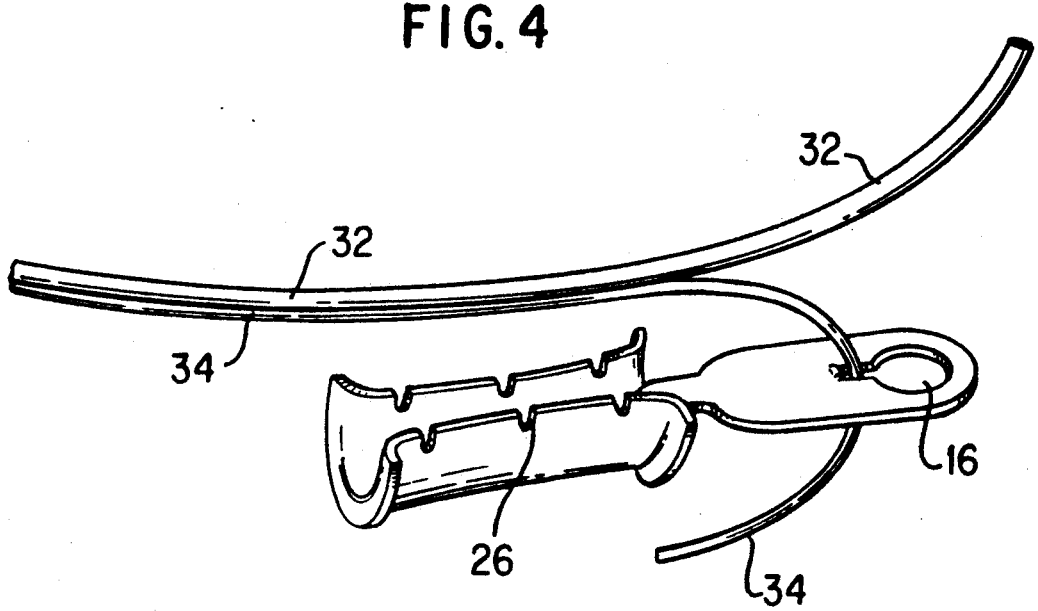
FIG. 5 is a perspective view showing an intermediate stage in the installation of the cable into the clamp of the present invention.
Figure 6:
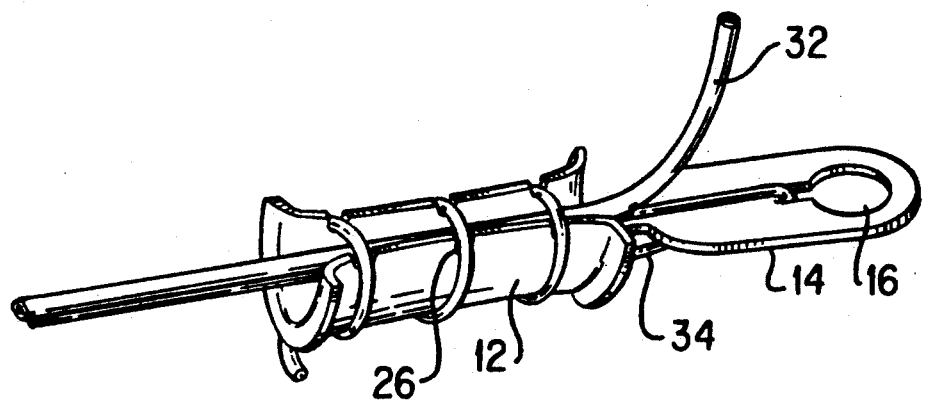
FIG. 6 shows a perspective view of a fully installed cable.

The installation of a double-stranded cable in the clamp of the present invention is shown in FIGS. 4–6. It can be seen in FIG. 4 that the double-stranded cable includes message strand 32 and support strand 34. To install the cable in the present clamp, a section of support strand 34 is separated from the cable and inserted through aperture 30, with the cable being laid in the trough 12. The free end of the support strand is then wrapped around the trough as shown in FIG. 6, to capture the cable in the trough. The support strand engages one of the notches 28 on flange 18 and the notches on the edges of the trough. Alternatively, the support strand may also engage the notch in tab 36 which extends from flange 18 to facilitate making a 90° turn of the support wire as it is wrapped around the trough. In FIG. 6, the support strand is shown wrapped around the trough in a counter-clockwise direction (viewed from the left side of the Figure). A clockwise wrap would also be satisfactory. The clamp can then be suspended from a suitable support, such as a "P" house hook or a "Q" span clamp by means of the aperture 16 in the plate 14. The weight of the cable is borne by the clamp, the weight being transferred to the clamp from the support wire and the aperture 30. As noted previously, the edges of the aperture can be radiused, or the aperture formed by the folding of a tab, at the contacting portion to reduce the possibility of damage to the support strand.

Although a detailed description of the present invention has been provided above, the present invention is not limited thereto, but is defined in the following claims.

What is claimed is:

1. A drop wire clamp for a cable which includes a support strand and a signal-carrying strand, the clamp comprising:
    an open trough for accepting the cable without threading, wherein the open portion of the trough is defined by edges, the edges of the trough being provided with means for retaining support strand which has been separated from the cable and wrapped around the trough to contain the cable in the trough; and
    means for engaging a support so that the clamp can be supported from a desired structure, wherein a plate extends from one end of the trough and carries the means for engaging.

2. A clamp as claimed in claim 1, wherein an aperture in the plate defines the means for engaging.

3. The clamp as claimed in claim 1, wherein the trough has first and second ends defined by flanges extending outwardly from the trough.

4. The clamp as claimed in claim 1, wherein the means for retaining comprise a plurality of notches formed in the edges of the trough.

5. The clamp as claimed in claim 1, wherein the plate is provided with an aperture for accepting support strand which is separated from the cable.

6. The clamp as claimed in claim 5, wherein the aperture is formed by a folded tab.

7. The clamp as claimed in claim 1, wherein the trough has first and second ends defined by flanges extending outwardly from the trough, the flanges being provided with second means for retaining support strand which has been separated by the cable.

8. The clamp as claimed in claim 7, wherein the means for retaining and the second means for retaining are notches.

9. The clamp as claimed in claim 1, wherein at least one of said flanges has a tab extending therefrom, said tab having a notch therein for receiving the support strand to facilitate wrapping the strand around the trough.

10. A drop wire for a cable which includes a support strand and a signal-carrying strand, the clamp comprising:
    an open trough for accepting the cable without threading; and
    means for engaging a support so that the clamp can be supported from a desired structure, wherein a plate extends from one end of the trough and carries the means for engaging, said plate having an aperture for accepting support strand which is separated from the cable, the aperture having a wall provided with rounded edges where the support strand bears against the wall, whereby abrasion of the support strand is essentially prevented.

11. A method for supporting a cable in a drop wire clamp having an open trough for accepting the cable without threading and means for engaging a support so that the clamp can be supported from a desired structure, the cable including a support strand and a signal-carrying strand, the method comprising:
    separating a length of support strand from the cable;
    laying the cable in the trough of the clamp; and
    wrapping the separated support strand around the trough to contain the cable in the trough.

* * * * *